H. E. A. ROCHE & C. ROY.
ADJUSTABLE HEADLIGHT.
APPLICATION FILED SEPT. 19, 1912.

1,065,726.

Patented June 24, 1913.

Witnesses
Stuart R W Allen
G. M. Moreland

Inventors
H. E. A. Roche.
C. Roy.
By Fred B. Fetherstonhaugh
Their Attorneys

UNITED STATES PATENT OFFICE.

HENRY E. A. ROCHE AND CLEOPHAS ROY, OF HAWKESBURY, ONTARIO, CANADA.

ADJUSTABLE HEADLIGHT.

1,065,726.

Specification of Letters Patent. Patented June 24, 1913.

Application filed September 19, 1912. Serial No. 721,289.

*To all whom it may concern:*

Be it known that we, HENRY E. A. ROCHE and CLEOPHAS ROY, both of Hawkesbury, in the Province of Ontario and Dominion of Canada, have invented certain new and useful Improvements in Adjustable Headlights, of which the following is a full, clear, and exact description.

This invention relates to improvements in headlights for vehicles, and the object is to provide means for automatically turning the vehicle lamps from side to side prior to the turning of the vehicle itself in order that the intended path may be illuminated before the vehicle turns into it.

It frequently happens that in driving an automobile the chauffeur is compelled to turn sharply to one side, and his eyes, accustomed to the brilliantly lighted road ahead, are absolutely unable to determine the nature of the ground into which he is turning the automobile, until the car body swings around and directs the light of the lamps onto the intended path. If there is a ditch, vehicle or other obstruction close ahead, the car cannot be turned back into its original path quickly enough to avoid accident unless it is traveling at a very low rate of speed. This condition is due to the fact that in an automobile the front wheels turn into the intended path before the body of the car moves laterally to any appreciable extent. Thus it is necessary to turn the car completely into the new path and advance it sufficiently to aline the body with the new path before the lamps direct their light in the desired direction. From the foregoing it will be clearly understood that whenever a sharp turn is made from the straight path, the path turned into is in darkness until the car has advanced some distance, in point of fact, its own length.

In the present invention the headlights are revolubly mounted and are connected to the spreader connecting the front wheel spindles so that when the wheels are turned to guide the car into a new path the lamps turn simultaneously in the same direction and illuminate the intended path, thus disclosing any obstruction before the car is too far advanced to avoid the same. In fact, the illumination of the new path is effected before the car body swings from its original line of travel so that if an obstruction appears a quick re-turn of the front wheels holds the car to the road with only a slight swerve.

Figure 1:
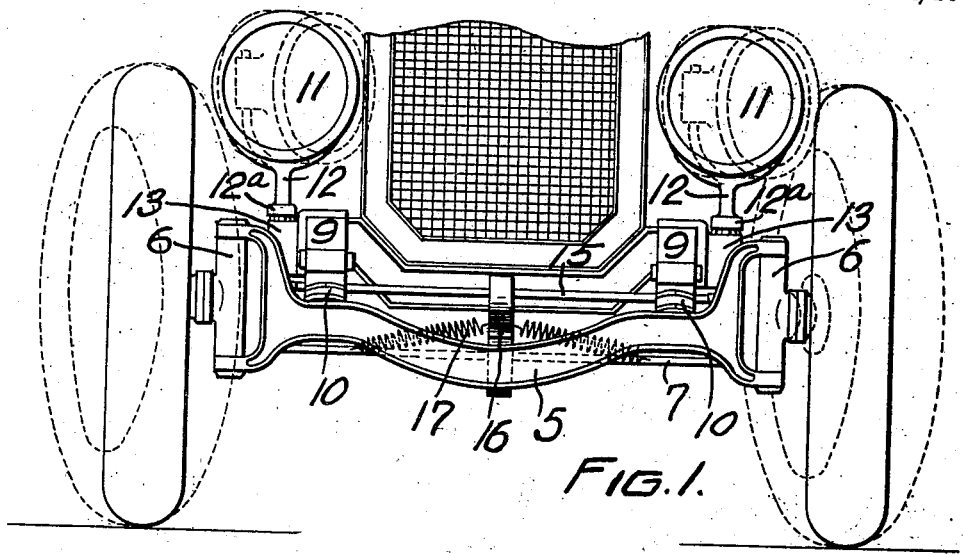
Figure 2:
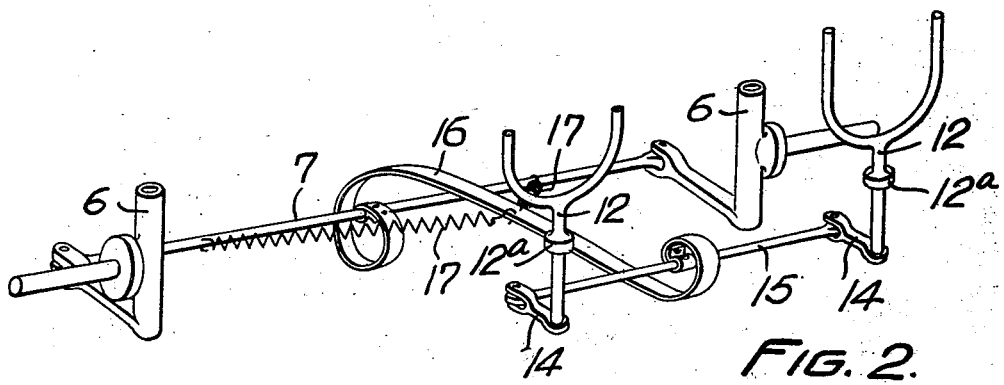

In the drawings which illustrate the invention:—Figure 1 is a front elevation of an automobile showing the present invention applied thereto. Fig. 2 is a perspective view of the entire apparatus removed from the car and shows its connection to the steering gear.

Referring more particularly to the drawings, 5 designates the front axle of an automobile having the usual bifurcated ends in which the wheel carrying spindles 6 are pivotally mounted so as to swing in a horizontal plane, and 7 designates the spreader connecting the wheel spindles 6 and operated laterally by the steering gear to shift the wheels. The side sills of the chassis are designated 9 and are connected to the front axle in the usual manner by the springs 10. The headlights 11 are mounted on the usual forks 12 which, instead of being rigidly secured to the sills, are revolubly mounted in vertically disposed sockets 13 fixed to the sills or other suitable part of the car. The stem of each fork 12 is provided with a collar 12ª between which and the top of the socket a suitable ball bearing may be placed so that the lamps may be turned with the greatest ease. Below the sockets the fork stems are provided with suitable levers 14, the free extremities of which are pivotally connected to a spreader 15. A reversely curved spring 16 is provided, having one of its ends rigidly secured to the center of the wheel spreader 7 and the opposite end rigidly secured to the center of the lamp spreader 15. Intermediate the ends of this spring 16, helical springs 17 are attached and extend in divergent directions toward the extremities of the wheel spreader 7 to which they are attached. In this way, a resilient connection is established between the lamp spreader and the wheel spreader. The springs 17 are of course of equal length and tension.

In steering the automobile, the wheel spreader is moved laterally to shift the wheels and thus carries the spring 16 laterally. Any resistance to the lateral movement or any yield of the spring 16 causes an unequal tension of the springs 17. In resuming their normal relation the springs cause the lamp spreader to resume its original relation to the wheel spreader, so that the lamp spreader moves similarly to the wheel spreader. This movement of the lamp spreader operating through the levers 14 partially rotates the forks 12 and turns the lamps relatively to the car body, the amount of turning being equal to and in the same direction as the turning of the wheels. This turning of the lamps illuminates the path into which the turned front wheels are guiding the car before the car body swings into line with the new path, so that if the path is seen to be unsafe the wheels may be returned to guide the car back onto the original path before it has progressed far enough to make turning back impossible. In addition to the above, the device acts as an indicator and by reason of the shifting beams of light warns an approaching vehicle or person to which side the car is turning.

Having thus described our invention, what we claim is:—

The combination with a vehicle having movable wheels and a rod connecting said wheels and arranged to move transversely of the direction of vehicle motion of a plurality of path illuminating lamps revolubly mounted on the vehicle, a rod connecting said lamps together, a reversely curved spring fixed at one end to the wheel connecting rod and at the opposite end to the lamp connecting rod, and resilient means connected to said spring extending from the approximate center of the spring in divergent directions toward and being connected to the extremities of the wheel connecting rod.

In witness whereof we have hereunto set our hands in the presence of two witnesses.

HENRY E. A. ROCHE.
CLEOPHAS ROY.

Witnesses:
  STUART R. W. ALLEN,
  G. M. MORELAND.